US009868322B1

(12) United States Patent
Varela

(10) Patent No.: US 9,868,322 B1
(45) Date of Patent: Jan. 16, 2018

(54) AXLE ASSEMBLY HAVING A WHEEL MOUNT DISPOSED ON A PLANET CARRIER

(71) Applicant: ArvinMeritor Technology, LLC, Troy, MI (US)

(72) Inventor: Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/223,034

(22) Filed: Jul. 29, 2016

(51) Int. Cl.

| | |
|---|---|
| ***B60B 27/06*** | (2006.01) |
| ***B60B 35/12*** | (2006.01) |
| ***B60B 35/18*** | (2006.01) |
| ***B60B 35/16*** | (2006.01) |
| ***B60K 17/04*** | (2006.01) |

(52) U.S. Cl.
CPC .......... *B60B 35/125* (2013.01); *B60B 27/065* (2013.01); *B60B 35/16* (2013.01); *B60B 35/18* (2013.01); *B60K 17/046* (2013.01); *B60B 2380/30* (2013.01)

(58) Field of Classification Search
None
See application file for complete search history.

(56) References Cited

U.S. PATENT DOCUMENTS

| | | | | |
|---|---|---|---|---|
| 2,460,295 A | | 2/1949 | Keese | |
| 2,726,106 A | * | 12/1955 | Houck | B60B 27/065 301/1 |
| 3,156,506 A | | 11/1964 | Scheifele et al. | |
| 4,159,657 A | | 7/1979 | Stilley | |
| 4,441,570 A | | 4/1984 | Damm et al. | |
| 4,646,880 A | | 3/1987 | Logan | |
| 5,163,816 A | * | 11/1992 | Goetzke | F01D 5/025 403/2 |
| 5,460,578 A | * | 10/1995 | Giuriati | B60K 17/046 188/72.9 |
| 5,645,148 A | | 7/1997 | Saurin et al. | |
| 5,871,413 A | | 2/1999 | Tar et al. | |
| 6,817,963 B1 | | 11/2004 | Solka | |
| 7,044,883 B2 | | 5/2006 | Andersson et al. | |
| 8,251,861 B2 | | 8/2012 | Varela | |
| 8,771,132 B2 | | 7/2014 | Fujimoto et al. | |
| 8,951,156 B2 | | 2/2015 | Klemm et al. | |
| 2001/0004617 A1 | * | 6/2001 | Massaccesi | B60K 17/046 475/269 |

(Continued)

FOREIGN PATENT DOCUMENTS

| | | |
|---|---|---|
| CH | 393838 A | 6/1965 |
| DE | 847549 C | 8/1952 |

(Continued)

OTHER PUBLICATIONS

U.S. Appl. No. 14/930,843, filed Nov. 3, 2015.

(Continued)

*Primary Examiner* — Justin Holmes
(74) *Attorney, Agent, or Firm* — Brooks Kushman P.C.

(57) ABSTRACT

An axle assembly having a wheel mount that is disposed on a planet carrier of a planetary gear set. The wheel mount may be fixedly positioned with respect to the planet carrier with one or more fasteners and one or more dowels so that the wheel mount and planet carrier may rotate together about an axis.

20 Claims, 5 Drawing Sheets

(56) References Cited

U.S. PATENT DOCUMENTS

| | | | | |
|---|---|---|---|---|
| 2004/0254044 | A1 | 12/2004 | Oberstarr | |
| 2005/0020400 | A1 | 1/2005 | Chung | |
| 2009/0029821 | A1 | 1/2009 | Martin, III et al. | |
| 2009/0166112 | A1 * | 7/2009 | Yoshino | B60K 7/0007 180/65.51 |
| 2010/0151982 | A1 | 6/2010 | Waksmundzki | |
| 2010/0181136 | A1 | 7/2010 | Swasey et al. | |
| 2014/0031160 | A1 * | 1/2014 | Suzuki | H02K 7/116 475/149 |
| 2014/0135164 | A1 * | 5/2014 | Ishizuka | B60K 17/046 475/331 |

FOREIGN PATENT DOCUMENTS

| | | | | |
|---|---|---|---|---|
| DE | 19718744 | C1 | 11/1998 | |
| DE | 10230768 | A1 | 1/2004 | |
| DE | 102007017700 | A1 | 10/2008 | |
| DE | 102007045531 | A1 | 4/2009 | |
| DE | 102010049615 | A1 | 5/2011 | |
| EP | 1 396 660 | A2 | 3/2004 | |
| EP | 1690725 | A2 * | 8/2006 | B60K 7/0007 |
| EP | 2 735 463 | A1 | 5/2014 | |
| JP | 2003127683 | A | 5/2003 | |

OTHER PUBLICATIONS

U.S. Appl. No. 14/930,918, filed Nov. 3, 2015.
U.S. Appl. No. 14/930,947, filed Nov. 3, 2015.
European Patent Office, Extended European Search Report for the corresponding European Patent Application No. 17177069.6 dated Aug. 28, 2017.

* cited by examiner

AXLE ASSEMBLY HAVING A WHEEL MOUNT DISPOSED ON A PLANET CARRIER

TECHNICAL FIELD

This disclosure relates to an axle assembly having a wheel mount disposed on a planet carrier of a planetary gear set.

BACKGROUND

A drive axle having a planetary wheel end is disclosed in U.S. Pat. No. 4,646,880.

SUMMARY

In at least one embodiment, an axle assembly is provided. The axle assembly may include an axle housing, a wheel bearing cage, a planetary gear set, a wheel mount, one or more dowels, and one or more fasteners. The wheel bearing cage may be fixedly positioned with respect to the axle housing. The planetary gear set may be received in the wheel bearing cage. The planetary gear set may have a planet carrier that may rotate about an axis. The wheel mount may be disposed on the planet carrier and may be configured to facilitate mounting of a wheel. One or more dowels may be received in the wheel mount and the planet carrier. One or more fasteners may couple the wheel mount to the planet carrier.

In at least one embodiment, an axle assembly is provided. The axle assembly may include an axle housing, a wheel bearing cage, a planetary gear set, a wheel mount, one or more dowels, and a preload bolt. The wheel bearing cage may be fixedly positioned with respect to the axle housing. The planetary gear set may be received in the wheel bearing cage. The planetary gear set may have a planet carrier that may rotate about an axis. The wheel mount may be disposed on the planet carrier and may be configured to facilitate mounting of a wheel. The preload bolt may extend along the axis and may couple the wheel mount to the planet carrier. One or more dowels may be arranged around the preload bolt and may be received in the wheel mount and the planet carrier.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
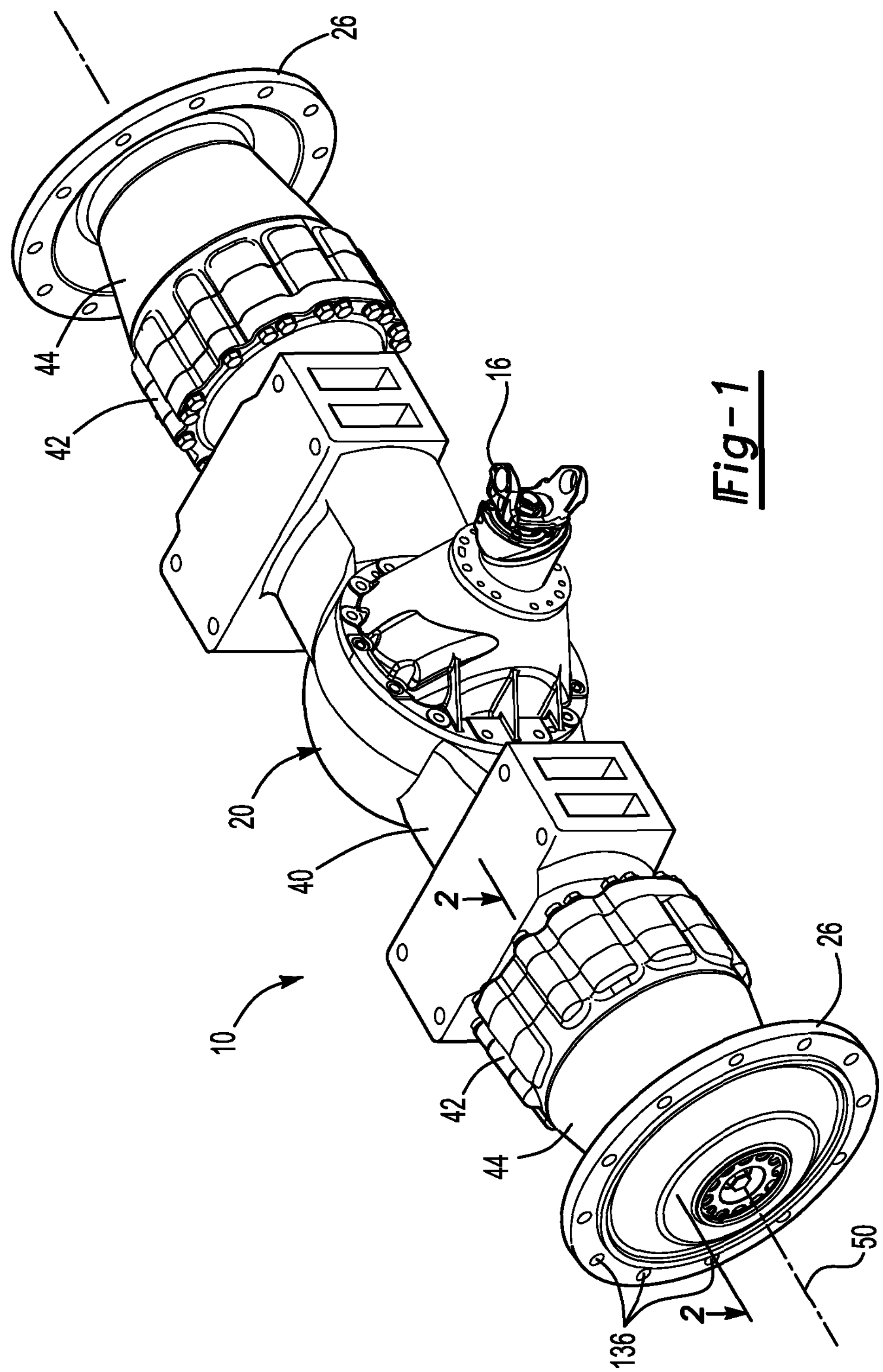
FIG. 1 is a perspective view of an exemplary axle assembly.

Referring to FIG. 1, an example of an axle assembly 10 is shown. The axle assembly 10 may be provided with a motor vehicle like a truck, bus, construction equipment, farm equipment, mining equipment, military transport or weaponry vehicle, or cargo loading equipment for land, air, or marine vessels. The motor vehicle may include a trailer for transporting cargo in one or more embodiments.

Figure 2:
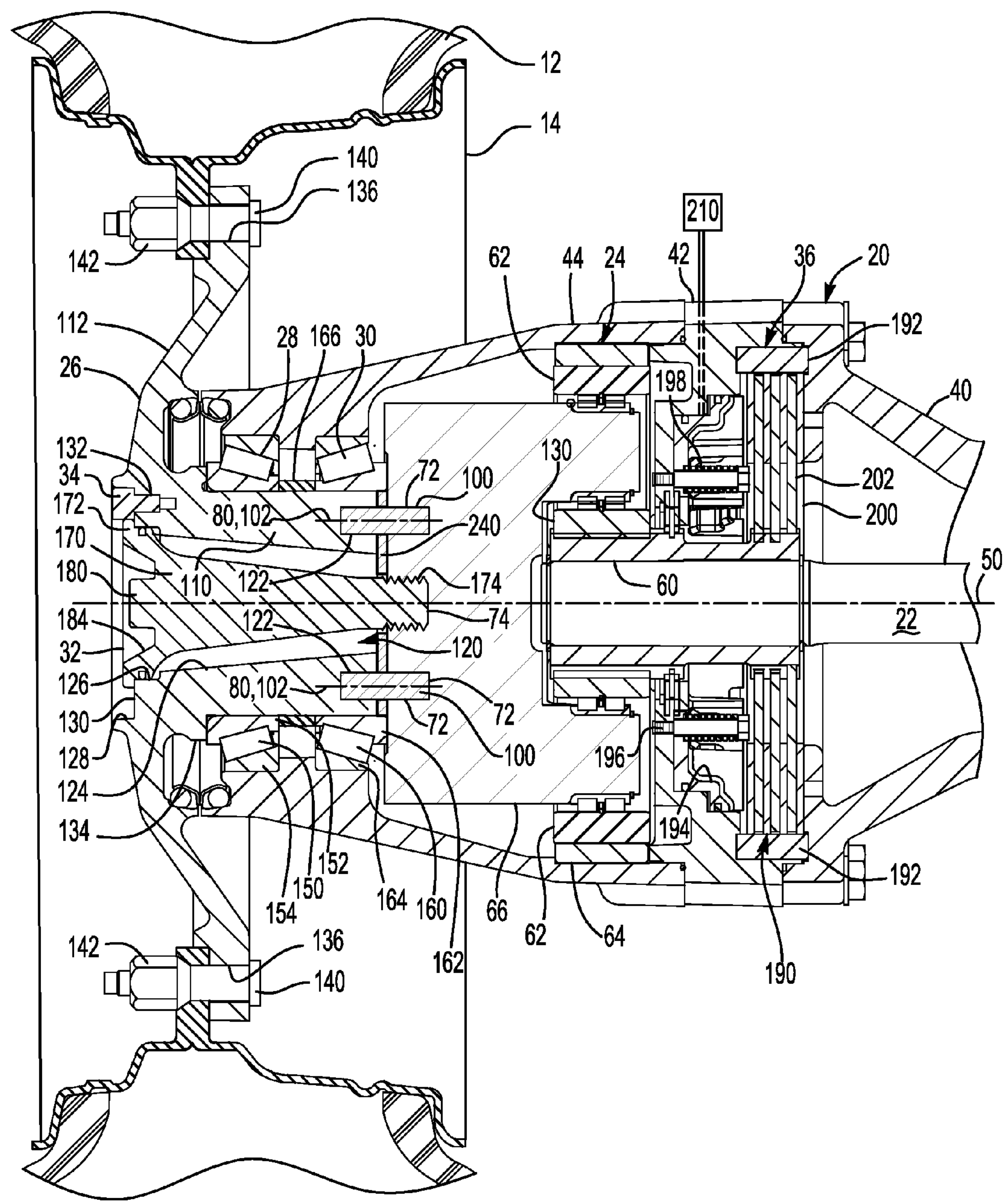
FIG. 2 is a section view of the axle assembly along section line 2-2.

The axle assembly 10 may be a drive axle that may be part of a vehicle drivetrain that may provide torque to one or more traction wheel assemblies, such as a wheel assembly that may include a tire 12 mounted on a wheel 14 as is best shown in FIG. 2. The vehicle drivetrain may include a power source, such as a motor, that may be operatively connected to an input 16 of the axle assembly 10. The input 16 may be operatively connected to a differential of the axle assembly 10, which in turn may be operatively connected to a wheel assembly via an axle shaft.

One or more axle assemblies 10 may be provided with the vehicle. For example, the axle assembly 10 may be part of a tandem axle configuration or multi-axle configuration that may include a plurality of axle assemblies that may be connected in series. Alternately, an axle assembly 10 may not be connected in series with another axle assembly in one or more embodiments. Referring to FIGS. 1 and 2, the axle assembly 10 may include a housing assembly 20, an axle shaft 22, a planetary gear set 24, a wheel mount 26, a first roller bearing assembly 28, a second roller bearing assembly 30, a preload bolt 32, a locking fastener 34, and a brake assembly 36.

The housing assembly 20 may receive various components of the axle assembly 10. For example, components and subassemblies like the axle shaft 22, planetary gear set 24, wheel mount 26, first roller bearing assembly 28, second roller bearing assembly 30, and brake assembly 36 may be disposed inside the housing assembly 20. In addition, the housing assembly 20 may facilitate mounting of the axle assembly 10 to the vehicle. In at least one embodiment, the housing assembly 20 may include an axle housing 40, a brake housing 42, and a wheel bearing cage 44.

The axle housing 40 may be disposed proximate the center of the housing assembly 20. For example, the axle housing 40 may extend between brake housings 42 that may be disposed near opposite ends of the axle assembly 10. The axle housing 40 may be configured to receive a differential and the axle shafts 22 that may extend from the differential.

Referring to FIGS. 1 and 2, the brake housing 42 may be disposed between the axle housing 40 and the wheel bearing cage 44. The brake housing 42 may be assembled to the axle housing 40 and the wheel bearing cage 44 with one or more fasteners, such as bolts, that may extend through the corresponding fastener holes in the axle housing 40, brake housing 42, and wheel bearing cage 44. As such, the axle housing 40, brake housing 42, and wheel bearing cage 44 may be fixedly positioned with respect to each other.

The wheel bearing cage 44 may be disposed on the brake housing 42 and may be disposed at an end of the housing assembly 20. As is best shown in FIG. 2, the wheel bearing cage 44 may extend around an axis 50 and may have a tapered exterior surface that may become narrower or may extend closer to the axis 50 in a direction that extends away from the brake housing 42. The wheel bearing cage 44 may receive and may facilitate mounting of the first roller bearing assembly 28 and the second roller bearing assembly 30. In addition, the wheel bearing cage 44 may define a cavity that may receive a planet carrier of the planetary gear set 24 and a tubular portion of the wheel mount 26 as will be discussed in more detail below.

Figure 3:
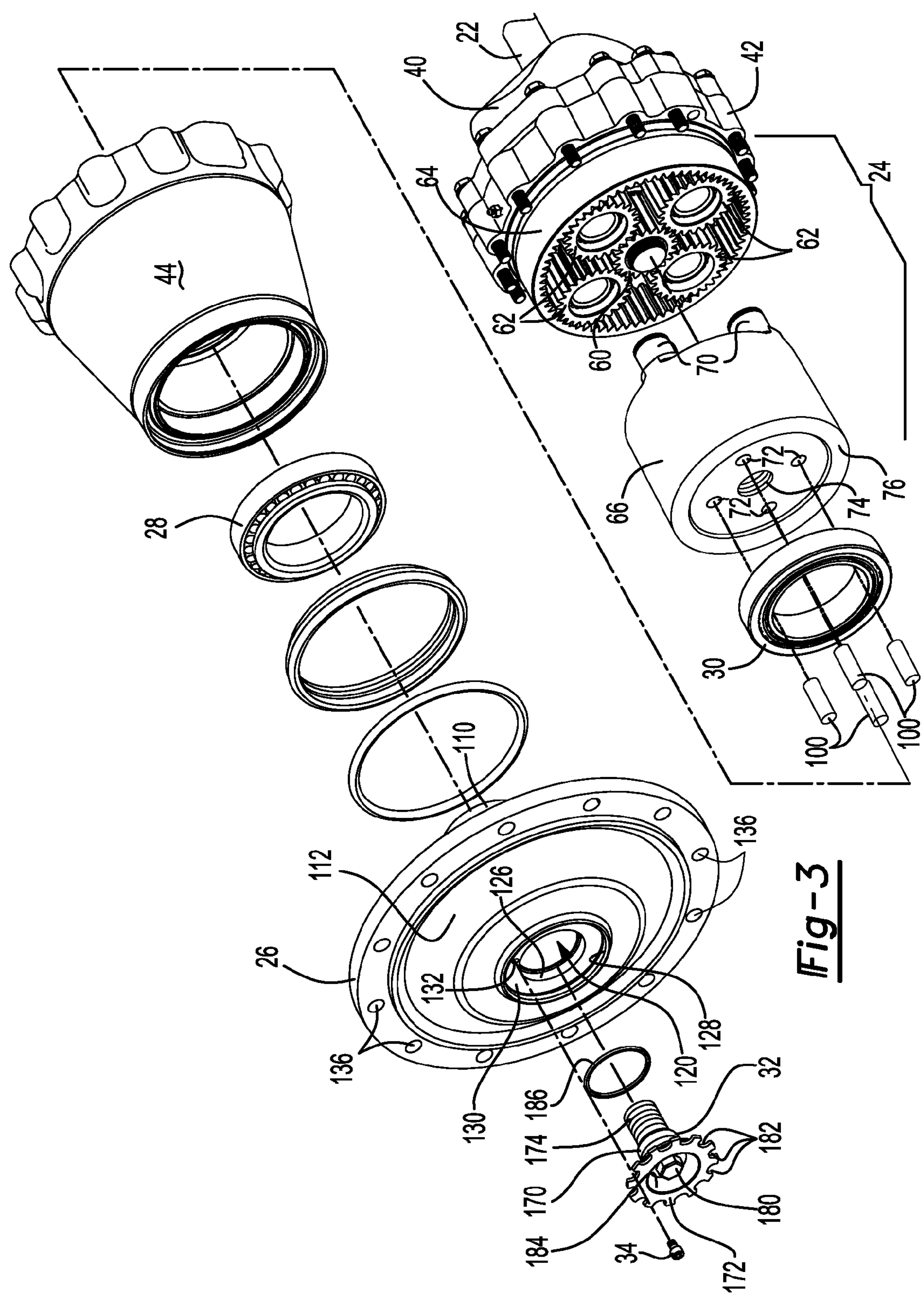
FIG. 3 is an exploded view of a portion of the axle assembly of FIG. 1.

Referring to FIGS. 2 and 3, the axle shaft 22 may transmit torque from the differential to a planetary gear set 24. For example, the axle shaft 22 may extend along and may be rotated about an axis 50 by the differential. The axle shaft 22 may have a first end and a second end. The first end may be operatively connected to the planetary gear set 24. The second end may be disposed opposite the first end and may be operatively connected to the differential.

The planetary gear set 24 may be disposed in the housing assembly 20. For instance, the planetary gear set 24 may be received in the wheel bearing cage 44. The planetary gear set 24 may be configured to provide a desired gear reduction ratio and increase torque provided to a wheel 14. In at least one embodiment, the planetary gear set 24 may include a sun gear 60, a plurality of planet pinions 62, a ring gear 64, and a planet carrier 66.

The sun gear 60 may be disposed proximate the center of the planetary gear set 24. The sun gear 60 may also be disposed on the axle shaft 22 such that the sun gear 60 may rotate about the axis 50 with the axle shaft 22. For instance, the sun gear 60 may have a hole that may receive the axle shaft 22. One or more fasteners, such as snap rings, may be provided to secure the sun gear 60 to the axle shaft 22 and limit movement of the sun gear 60 in an axial direction or along the axis 50. The sun gear 60 may have a set of teeth that may engage and mesh with the planet pinions 62.

The planet pinions 62 may be spaced apart from each other and may be rotatably disposed between the sun gear 60 and the ring gear 64. Each planet pinion 62 may have a planet pinion hole and a set of teeth. The set of teeth may be disposed opposite the planet pinion hole on an exterior surface or outside diameter of the planet pinion 62. The set of teeth may mesh with teeth on the sun gear 60 and teeth on the ring gear 64. Each planet pinion 62 may be configured to rotate about a different planet pinion axis. The planet pinion axes may extend substantially parallel to the axis 50.

The ring gear 64 may extend around the axis 50 and may be disposed between the wheel bearing cage 44 and the planet pinions 62. In addition, the ring gear 64 may include a plurality of teeth that may extend toward the axis 50 and may mesh with teeth on the planet pinions 62. The ring gear 64 may be fixedly positioned with respect to the housing assembly 20 and the axis 50. For example, the ring gear 64 may be disposed in the housing assembly 20 such that an outside circumference of the ring gear 64 may be disposed proximate and may engage the wheel bearing cage 44. The ring gear 64 may be disposed between the brake housing 42 and the wheel bearing cage 44 such that the brake housing 42 and the wheel bearing cage 44 may cooperate to inhibit axial movement of the ring gear 64.

The planet carrier 66 may support to the planet pinions 62 and may be configured to rotate about the axis 50. The planet carrier 66 may be provided in various configurations. In at least one embodiment, the planet carrier 66 may have a plurality of hubs 70, one or more dowel holes 72, and one or more fastener holes 74.

Each hub 70 may be received in corresponding planet pinion hole to help support and position a corresponding planet pinion 62. A roller bearing may be disposed in the planet pinion hole between a hub 70 and a corresponding planet pinion 62 to facilitate rotation of the planet pinion 62 with respect to the hub 70.

One or more dowel holes 72 may be provided in the planet carrier 66. In FIG. 3, four dowel holes 72 are shown; however, it is contemplated that a greater or lesser number of dowel holes 72 may be provided. The dowel holes 72 may be spaced apart from each other and may be arranged around the axis 50. In addition, the dowel holes 72 may be disposed at a generally equal radial distance from the axis 50. Each dowel hole 72 may extend from an end or end surface 76 of the planet carrier 66 toward the axle housing 40 or to the right from the perspective shown in FIG. 2. Each dowel hole 72 may extend along and may be centered about a dowel hole axis 80. The dowel hole axis 80 may extend substantially parallel to the axis 50.

Each dowel hole 72 may be configured to receive a dowel 100 that may help position the wheel mount 26 on the planet carrier 66 and help inhibit rotation or movement of the wheel mount 26 with respect to the planet carrier 66. The dowel 100 may be a solid dowel or a hollow dowel and may help transmit high torque loads between the planet carrier 66 and the wheel mount 26. Each dowel 100 may have a generally cylindrical configuration and may extend along a dowel axis 102 that may be coaxially disposed with the dowel hole axis 80.

At least one fastener hole 74 may be provided in the planet carrier 66. In FIGS. 2 and 3, one fastener hole 74 is provided that may extend along the axis 50 from the end surface 76 toward the axle shaft 22. The fastener hole 74 may be threaded or have one or more threads that may mate with a threaded portion of the preload bolt 32 as will be discussed in more detail below.

Referring to FIGS. 2 and 3, the wheel mount 26 may facilitate mounting of a wheel 14 and may be disposed on and may engage the planet carrier 66. In addition, the wheel mount 26 may be partially received in the wheel bearing cage 44 such that the wheel mount 26 may be spaced apart from and may not engage the wheel bearing cage 44. In at least one embodiment, the wheel mount 26 may include a tubular portion 110 and a flange portion 112.

The tubular portion 110 may be at least partially disposed in the housing assembly 20. The tubular portion 110 may extend around the axis 50 and may at least partially define a wheel mount hole 120 and one or more dowel openings 122.

The wheel mount hole 120 may extend through the wheel mount 26 and may not receive the planet carrier 66 in one or more embodiments. The tubular portion 110 may have an exterior surface that may be disposed opposite the wheel mount hole 120. The exterior surface may support the first roller bearing assembly 28 and the second roller bearing assembly 30. As is best shown in FIG. 2, the tubular portion 110 may have a first inner surface 124 that may extend around the axis 50. The first inner surface 124 may at least partially define the wheel mount hole 120 and may be spaced apart from and may not engage the preload bolt 32.

One or more dowel openings 122 may be arranged around the axis 50. Each dowel opening 122 may be aligned with a corresponding dowel hole 72 in the planet carrier 66. As such, a dowel opening 122 may be coaxially disposed with a dowel hole 72, dowel hole axis 80, and a dowel 100. Each dowel opening 122 may extend from an end of the tubular portion 110 toward the flange portion 112 or to the left from the perspective shown in FIG. 2. The dowel opening 122 may receive and engage a dowel 100. Moreover, the dowel opening 122 may be a blind hole that may engage an end of the dowel 100 to limit axial movement of the dowel 100 in one or more embodiments.

The flange portion 112 may be disposed outside of the housing assembly 20 and may be integrally formed with the tubular portion 110. The flange portion 112 may be disposed at an end of the tubular portion 110 and may extend away from the axis 50. The flange portion 112 may be spaced apart from and may not engage the housing assembly 20. For instance, a gap may be provided between the flange portion 112 and the wheel bearing cage 44 to permit rotational movement of the wheel mount 26 and to facilitate application of a preload force on the first roller bearing assembly 28, the second roller bearing assembly 30, or both as will be discussed in more detail below.

The flange portion 112 may at least partially define the wheel mount hole 120 and may receive the preload bolt 32. In at least one embodiment, the flange portion 112 may include a second inner surface 126, a third inner surface 128, a step surface 130, a locking fastener opening 132, a rim 134, and a plurality of wheel stud holes 136.

The second inner surface 126 may extend around the axis 50 and may at least partially define the wheel mount hole 120. The second inner surface 126 may be axially positioned between the first inner surface 124 and the third inner surface 128. The second inner surface 126 may be disposed further from the axis 50 than the first inner surface 124.

The third inner surface 128 may extend around the axis 50 and may at least partially define the wheel mount hole 120. The third inner surface 128 may be disposed further from the axis 50 than the second inner surface 126. As such, the third inner surface 128 may have a larger diameter than the second inner surface 126.

The step surface 130 may extend between the second inner surface 126 and the third inner surface 128. For example, the step surface 130 may extend from the second inner surface 126 to the third inner surface 128. In addition, the step surface 130 may be disposed substantially perpendicular to the axis 50 in one or more embodiments.

One or more locking fastener openings 132 may be provided to receive a locking fastener 34. The locking fastener opening 132 may be disposed in various locations, such as in the step surface 130 or the third inner surface 128. The locking fastener opening 132 may be a threaded hole that may receive and retain the locking fastener 34.

The rim 134 may be disposed opposite the wheel mount hole 120 and may extend away from the axis 50. The rim 134 may be disposed opposite the first inner surface 124 and may engage an inner race of the first roller bearing assembly 28.

The wheel stud holes 136 may facilitate mounting of a wheel 14 to the wheel mount 26. The wheel stud holes 136 may be through holes that may be arranged around the axis 50. Each wheel stud hole 136 may receive a fastener, such as a wheel stud 140 that may extend through a corresponding hole on the wheel 14. A lug nut 142 may be attached to the wheel stud 140 to secure the wheel 14 to the wheel mount 26.

Referring primarily to FIG. 2, the first roller bearing assembly 28 may be disposed in the housing assembly 20 and may rotatably support the wheel mount 26. For example, the first roller bearing assembly 28 may extend between the wheel mount 26 and the wheel bearing cage 44 and may be axially positioned near an end of the wheel bearing cage 44 that may be disposed opposite the brake housing 42. The first roller bearing assembly 28 may include a plurality of rolling elements 150, such as balls or rollers, that may be disposed between a first inner race 152 and a first outer race 154. The first inner race 152 may be disposed proximate and may engage the wheel mount 26. In addition, the first inner race 152 may be disposed proximate and may engage the rim 134 of the wheel mount 26 such that the wheel mount 26 may exert a preload force against the first inner race 152 when the preload bolt 32 is tightened as will be discussed in more detail below. The first outer race 154 may be disposed proximate and may engage the wheel bearing cage 44 such that the wheel bearing cage 44 may inhibit movement of the first outer race 154 in an axial direction that may extend toward the axle housing 40, or to the right from the perspective shown in FIG. 2.

The second roller bearing assembly 30 may be disposed in the housing assembly 20 and may also rotatably support the wheel mount 26. For example, the second roller bearing assembly 30 may extend between the wheel mount 26 and the wheel bearing cage 44 and may be axially positioned between the first roller bearing assembly 28 and the planet carrier 66. The second roller bearing assembly 30 may include a plurality of rolling elements 160, such as balls or rollers, that may be disposed between a second inner race 162 and a second outer race 164. The second inner race 162 may be disposed on and may engage the wheel mount 26 and the planet carrier 66. As such, the planet carrier 66 may help exert a preload force against the second inner race 162 when the preload bolt 32 is tightened. The second outer race 164 may be disposed proximate and may engage the wheel bearing cage 44 such that the wheel bearing cage 44 may inhibit movement of the second outer race 164 in an axial direction that may extend away from the axle housing 40, or to the left from the perspective shown in FIG. 2.

Optionally, a bearing spacer 166 may be provided between the first roller bearing assembly 28 and the second roller bearing assembly 30. The bearing spacer 166 may extend from the first inner race 152 to the second inner race 162 to inhibit movement of the first inner race 152 and second inner race 162 with respect to each other. The bearing spacer 166 may be disposed on the tubular portion 110 of the wheel mount 26 and may be configured as a ring that may extend around the tubular portion 110 in one or more embodiments.

Referring to FIG. 3, the preload bolt 32 may be partially or completely received in the wheel mount hole 120 and may couple the wheel mount 26 to the planet carrier 66. In at least one embodiment, the preload bolt 32 may have a preload bolt body 170 and a preload bolt flange 172.

The preload bolt body 170 may extend along the axis 50 and may be received in the wheel mount hole 120. The preload bolt body 170 may have a threaded portion 174 that may be received in the fastener hole 74 of the planet carrier 66. The threaded portion 174 may have one or more threads that may mate with one or more threads in the fastener hole 74 of the planet carrier 66.

The preload bolt flange 172 may be integrally formed with the preload bolt body 170. The preload bolt flange 172 may be received in the wheel mount hole 120 may exert force on the wheel mount 26. For instance, the preload bolt flange 172 may engage and may exert force on the step surface 130 of the wheel mount 26. In addition, the preload bolt flange 172 may be spaced apart from the third inner surface 128 of the wheel mount 26. In at least one embodiment, the preload bolt flange 172 may include an engagement feature 180 and a set of preload bolt flange openings 182.

The engagement feature 180 may allow a tool to apply torque to rotate the preload bolt 32 about the axis 50. The engagement feature 180 may have any suitable configuration, such as a male configuration, female configuration or combinations thereof. In FIGS. 2 and 3, the engagement feature 180 has a male configuration that may be received in a tool, such as a socket or wrench. The engagement feature 180 may be at least partially received in a recess 184 in the preload bolt 32.

The set of preload bolt flange openings 182 may extend through the preload bolt flange 172. The preload bolt flange openings 182 may be arranged around the axis 50 and may be spaced apart from each other. The preload bolt flange openings 182 may have any suitable configuration. In the embodiment shown in FIG. 3, the preload bolt flange openings 182 are generally semicircular and extend from an outside circumferential surface of the preload bolt flange 172 toward the axis 50. Alternatively, the preload bolt flange openings 182 may be configured as through holes that may be completely defined with in the preload bolt flange 172 and may be spaced apart from the outside circumferential surface of the preload bolt flange 172.

A preload bolt seal 186 may be disposed between the preload bolt 32 and the wheel mount 26. The preload bolt seal 186 may help retain lubricant inside the axle assembly 10 and may inhibit contaminants from entering at least a portion of the wheel mount hole 120. For example, the preload bolt seal 186 may be configured as an O-ring that may extend around the axis 50.

The locking fastener 34 may inhibit rotation of the preload bolt 32 about the axis 50. For example, the locking fastener 34 may be inserted into or received in a preload bolt flange opening 182 that may be proximately aligned with the locking fastener opening 132 after the preload bolt 32 is tightened to exert a desired preload force on at least one of the first roller bearing assembly 28 and the second roller bearing assembly 30. As such, the locking fastener 34 may engage the preload bolt 32 and may be coupled to and may engage the wheel mount 26 to inhibit rotation of the preload bolt 32. The locking fastener 34 may be offset from the axis 50 and may not extend along the axis 50. The locking fastener 34 may have any suitable configuration. For instance, the locking fastener 34 may be a threaded fastener, such as a bolt or screw.

A preload force may be applied to the first roller bearing assembly 28 and/or the second roller bearing assembly 30 by rotating the preload bolt 32. Tightening the preload bolt 32 into the fastener hole 74 in the planet carrier 66 may cause the preload bolt flange 172 to exert force on the wheel mount 26 in an axial direction that may extend to the right from the perspective shown in FIG. 2. The rim 134 of the wheel mount 26 may then exert force on the first inner race 152 of the first roller bearing assembly 28 in the same direction. Tightening the preload bolt 32 may also pull the planet carrier 66 in an axial direction toward the wheel mount 26 or to the left from the perspective shown in FIG. 2. The planet carrier 66 may then exert force on the second inner race 162 of the second roller bearing assembly 30 in the same direction. As such, the preload bolt 32 may exert a preload force that may bias the first roller bearing assembly 28 toward the second roller bearing assembly 30.

The preload bolt 32 may provide axial flexibility that may allow a more stable preload force to be applied against one or more roller bearing assemblies. For example, the preload bolt 32 may cooperate with the wheel mount 26 and the planet carrier 66 to exert a stable or relatively constant preload force that may accommodate "settling" of the axle assembly 10 due to operation and initial wear. A preload force that remains substantially stable over time may reduce deflection with respect to the axis 50 and may increase operational life of the roller bearings and associated gears of the axle assembly 10. The preload bolt 32 may also eliminate the need for a separate wheel end cover that may otherwise be provided to cover and seal against the wheel mount 26 to retain lubricant inside the axle assembly 10.

Referring to FIG. 2, the brake assembly 36 may be adapted to slow or inhibit rotation of the sun gear 60 and an associated wheel 14 about the axis 50. The brake assembly 36 may be a wet disc brake assembly that may be disposed inside the housing assembly 20. In at least one embodiment, the brake assembly 36 may include a disc pack 190, one or more brake dowels 192, a piston 194, one or more shoulder bolts 196, and at least one biasing member 198.

The disc pack 190 may be received in the brake housing 42. The disc pack 190 may include one or more friction discs 200 and one or more stationary discs 202.

One or more friction discs 200 may be disposed on the sun gear 60 and may extend away from the axis 50. The friction discs 200 may have a hole that may receive sun gear 60 such that the friction disc 200 rotates about the axis 50 with the sun gear 60.

One or more stationary discs 202 may be disposed adjacent to a friction disc 200. The stationary discs 202 may be spaced apart from each other such that a friction disc 200 is disposed between adjacent stationary discs 202. The stationary discs 202 may extend from the brake housing 42 toward the axis 50 and may not rotate about the axis 50. The stationary discs 202 may at least partially receive a corresponding brake dowel 192.

One or more brake dowels 192 may extend from the axle housing 40 to the brake housing 42. The axle housing 40 and the brake housing 42 may cooperate to hold each brake dowel 192 in a fixed position such that the brake dowels 192 may not rotate about the axis 50.

The piston 194 may be received in the brake housing 42 between the planetary gear set 24 and the disc pack 190. The piston 194 may be configured to move in an axial direction with respect to the brake housing 42 between a retracted position and an extended position. The piston 194 may be actuated from a retracted position to an extended position by pressurized fluid from a pressurized fluid source 210. In the retracted position, the stationary discs 202 and friction discs 200 may not be deflected or urged against a flange of the axle housing 40. As such, force may not be exerted by the piston 194 against the disc pack 190 to brake to inhibit rotation of a wheel 14. In the extended position, the piston 194 may move toward the disc pack 190 and may urge the disc pack 190 toward the flange such that the stationary discs 202 and friction discs 200 may be deflected or urged toward the flange and against each other. As such, the stationary discs 202 and the friction discs 200 may engage each other, resulting in friction that may inhibit rotation of the friction discs 200 about the axis 50 with respect to the stationary discs 202. The friction discs 200 may then inhibit rotation of the sun gear 60, axle shaft 22, planetary gear set 24, and the wheel mount 26 and its associated wheel 14. A controller may open one or more valves to permit pressurized fluid to flow from the pressurized fluid source 210 through a fluid passage to actuate the piston 194 in response to a brake command.

One or more shoulder bolts 196 may be fixedly disposed on the brake housing 42. The shoulder bolts 196 may extend through the piston 194.

A biasing member 198 may be disposed on each shoulder bolt 196 between the disc pack 190 and the piston 194. The biasing member 198 may extend between the piston 194 and the enlarged head of the shoulder bolt 196. The biasing member 198 may exert a biasing force on the piston 194 that may actuate the piston 194 away from the flange of the axle housing 40 and toward the brake housing 42 (i.e., from the extended position toward the retracted position) when sufficient fluid pressure is not exerted on the opposite side of the piston 194. As such, the biasing member 198 may bias the piston 194 to the left from the perspective shown in FIG. 2.

Figure 4:
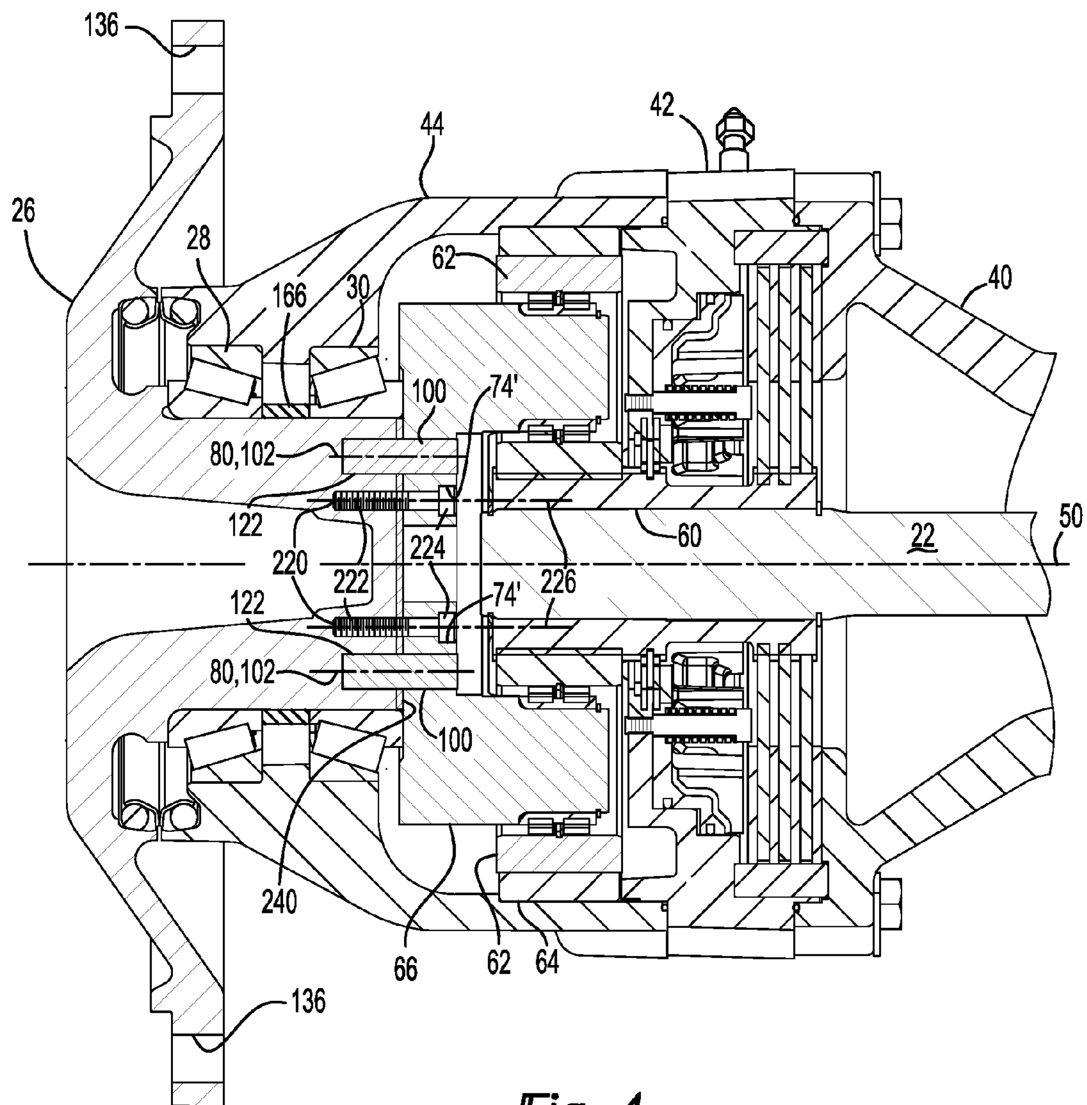
FIGS. 4 and 5 are section views showing alternative configurations for attaching a wheel mount to a planet carrier of the axle assembly.

Referring to FIG. 4, another configuration for mounting the wheel mount to the planet carrier is shown. This configuration is similar to that shown in FIG. 2, but multiple fastener holes 74' may be provided and repositioned on the planet carrier 66 and the wheel mount 26 has one or more fastener openings 220 that receive one or more fasteners 222 that replace the preload bolt 32. Moreover, the wheel mount 26 may be simplified by omitting features such as the second inner surface 126, third inner surface 128, step surface 130, and locking fastener opening 132. The locking fastener 34 may also be omitted.

One or more fastener holes 74' and fastener openings 220 may be arranged around the axis 50. Each fastener opening 220 may be aligned with a corresponding fastener hole 74' in the planet carrier 66. As such, the fastener hole 74' and fastener opening 220 may be coaxially disposed with the fastener 222. Each fastener hole 74' may be configured as a through hole that may extend through the planet carrier 66. Each fastener opening 220 may be a blind hole that may be threaded.

Each fastener 222 may extend through the fastener hole 74' and a corresponding fastener opening 220 to couple the wheel mount 26 the planet carrier 66. The fastener 222 may have any suitable configuration. For example, the fastener 222 may be configured as a threaded fastener, such as a bolt. An enlarged head 224 of the fastener 222 may be disposed in a fastener hole 74' while a threaded shaft of the fastener 222 may extend into the fastener hole 74' and mate with corresponding threads of the fastener hole 74'.

The fastener 222 may extend along a fastener axis 226. The fastener axis 226 may extend substantially parallel to the axis 50. However, each fastener 222 may be offset from the axis 50 such that the fastener 222 may not extend along or intersect the axis 50. The fastener axis 226 may be coplanar with the dowel axis 102 and the axis 50 in one or more embodiments. The fastener 222 may be radially positioned between the dowel 100 and the axis 50 or such that the fastener 222 and fastener axis 226 are disposed closer to the axis 50 than the dowel 100. As such the fastener 222 may be spaced apart from and may not engage the dowel 100 and a fastener 222 may be disposed between a dowel 100 and the axis 50.

Figure 5:
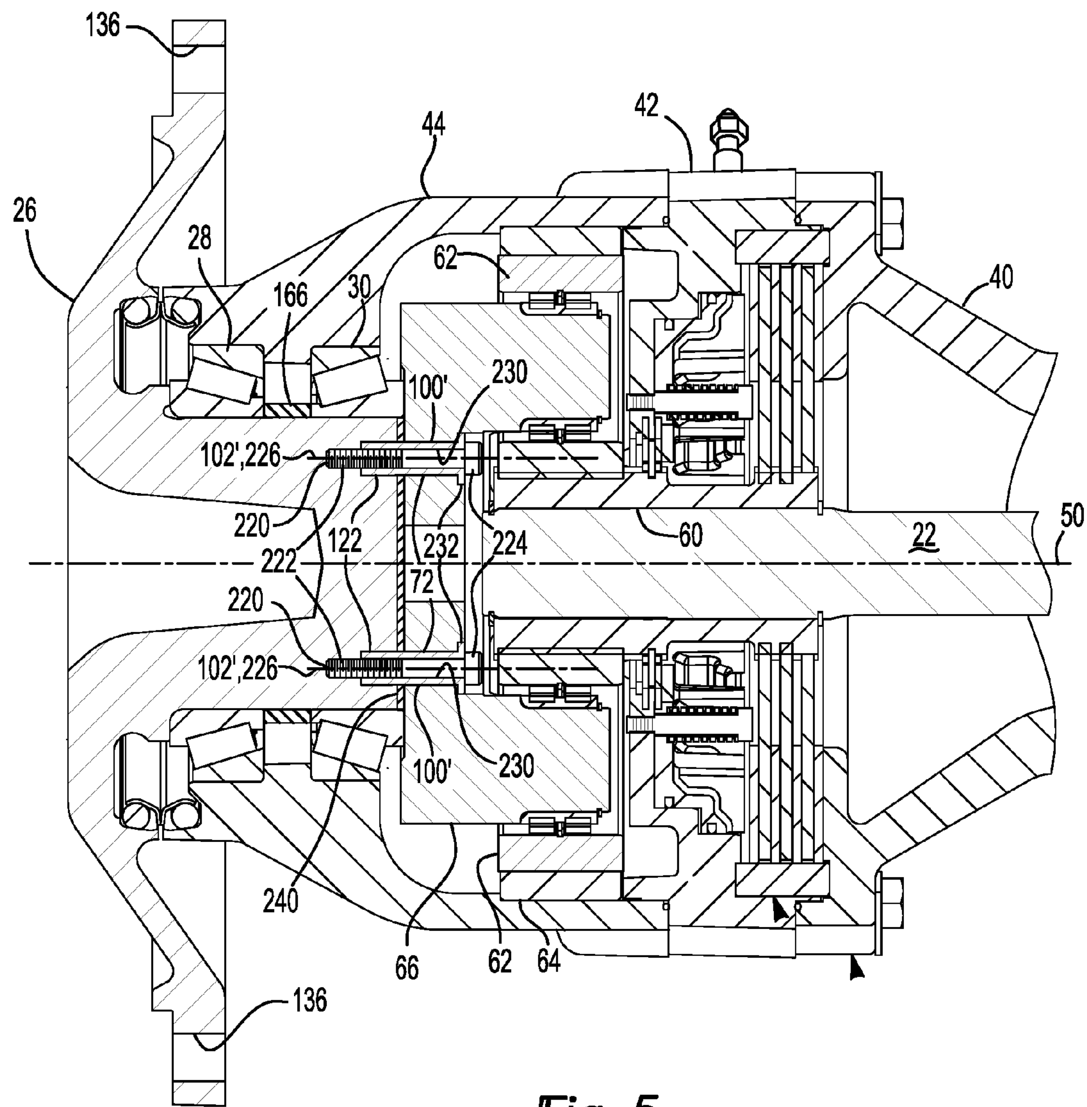

Referring to FIG. 5, another configuration for mounting the wheel mount to the planet carrier shown. This configuration is similar to that shown in FIG. 4. In this configuration, one or more fasteners 222 extend through the corresponding dowel 100'. More specifically, the dowel 100' is a hollow dowel that may have an internal dowel hole 230 and a dowel flange 232.

The internal dowel hole 230 may extend completely through the dowel 100' and may be disposed along and may be centered about the dowel axis 102'. The internal dowel hole 230 may receive the fastener 222. The dowel axis 102' may be coaxially disposed with the fastener axis 226.

The dowel flange 232 may be disposed at a first end of the dowel 100'. The dowel flange 232 may extend continuously around the dowel axis 102' and may extend away from the dowel axis 102'. For instance, the dowel flange 232 may be disposed substantially perpendicular to the dowel axis 102' in one or more embodiments. The dowel flange 232 may be received in the dowel hole 72 of the planet carrier 66 and may engage the planet carrier 66 to inhibit movement of the dowel 100'. As such, the dowel flange 232 may inhibit movement of the dowel 100' toward the wheel mount 26, or to the left from the perspective shown in FIG. 5.

The dowel 100' may have a second end that may be disposed opposite the first end and that may be received in the dowel opening 122 of the wheel mount 26.

The enlarged head 224 of the fastener 222 may be disposed on the dowel flange 232. In addition, the enlarged head 224 may be located outside of the dowel hole 72 between the dowel flange 232 and the planet carrier 66. The threaded portion of the fastener 222 may be received in the fastener opening 220, which may be disposed adjacent to the dowel opening 122. The fastener opening 220 may be coaxially disposed with the dowel opening 122 and may have a smaller diameter than the dowel opening 122 in one or more embodiments.

In any configuration, one or more shims 240 may be provided between the wheel mount 26 and the planet carrier 66 to help set the preload force exerted one or more of the roller bearings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
- an axle housing;
- a wheel bearing cage fixedly positioned with respect to the axle housing;
- a planetary gear set that is received in the wheel bearing cage, the planetary gear set having a planet carrier that rotates about an axis;
- a wheel mount that is disposed on the planet carrier and configured to facilitate mounting of a wheel;
- a dowel that is received in the wheel mount and the planet carrier; and
- a fastener that couples the wheel mount to the planet carrier.

2. The axle assembly of claim 1 wherein the wheel mount has a tubular portion that is disposed around the axis and that has a wheel mount hole that is centered about the axis, and a flange portion that extends from an end of the tubular portion to facilitate mounting of the wheel, wherein the planet carrier is disposed adjacent to the tubular portion but does not extend into the wheel mount hole.

3. The axle assembly of claim 1 wherein the fastener does not extend along the axis.

4. The axle assembly of claim 3 wherein the fastener and the dowel extend substantially parallel to the axis.

5. The axle assembly of claim 4 wherein the fastener is disposed between the dowel and the axis.

6. The axle assembly of claim 5 wherein the fastener does not engage the dowel.

7. The axle assembly of claim 4 wherein the dowel is received in a dowel opening in the wheel mount that is a blind hole.

8. The axle assembly of claim 4 wherein the dowel is received in a dowel opening in the planet carrier.

9. The axle assembly of claim 4 wherein the dowel has an internal dowel hole and the fastener extends through the internal dowel hole.

10. The axle assembly of claim 9 wherein the dowel extends along a dowel axis and the fastener extends along a fastener axis that is disposed substantially parallel to the dowel axis.

11. The axle assembly of claim 10 wherein the dowel axis is coaxially disposed with the fastener axis.

12. The axle assembly of claim 10 wherein the dowel has a dowel flange that is disposed at a first end of the dowel, wherein the dowel flange extends continuously around the dowel axis and extends away from the dowel axis.

13. The axle assembly of claim 12 wherein the dowel flange is received in a dowel opening in the planet carrier such that the dowel flange inhibits movement of the dowel toward the wheel mount.

14. The axle assembly of claim 13 wherein the dowel has a second end disposed opposite the first end, wherein the second end is received in a dowel opening in the wheel mount.

15. The axle assembly of claim 12 wherein the fastener has a head that is disposed on the dowel flange of the dowel outside of the internal dowel hole and between the dowel flange and a planet pinion that is rotatably disposed on the planet carrier.

16. An axle assembly comprising:

an axle housing;

a wheel bearing cage fixedly positioned with respect to the axle housing;

a planetary gear set that is received in the wheel bearing cage, the planetary gear set having a planet carrier that rotates about an axis;

a wheel mount that is disposed on the planet carrier and configured to facilitate mounting of a wheel;

a preload bolt that extends along the axis and couples the wheel mount to the planet carrier; and a set of dowels that are arranged around the preload bolt, wherein each member of the set of dowels is received in the wheel mount and the planet carrier.

17. The axle assembly of claim 16 wherein the wheel mount has a flange portion that facilitates mounting of the wheel and a tubular portion extends from the flange portion toward the planet carrier, the tubular portion having a wheel mount hole that extends along the axis, wherein the preload bolt extends completely through the wheel mount hole.

18. The axle assembly of claim 17 wherein the planet carrier is disposed adjacent to the tubular portion but does not extend into the wheel mount hole.

19. The axle assembly of claim 16 further comprising a first roller bearing assembly and a second roller bearing assembly that are disposed on the wheel bearing cage and rotatably support the wheel mount, wherein the set of dowels extend substantially parallel to the axis and are radially positioned with respect to the axis between the preload bolt and the second roller bearing assembly.

20. The axle assembly of claim 19 wherein the first roller bearing assembly has a first inner race that engages the wheel mount, the second roller bearing assembly has a second inner race that engages the wheel mount, and a bearing spacer extends from the first inner race to the second inner race.

* * * * *